Sept. 15, 1970  L. L. ROUTH  3,529,274
POWER DISTRIBUTION SYSTEM
Filed Jan. 4, 1968  4 Sheets-Sheet 1
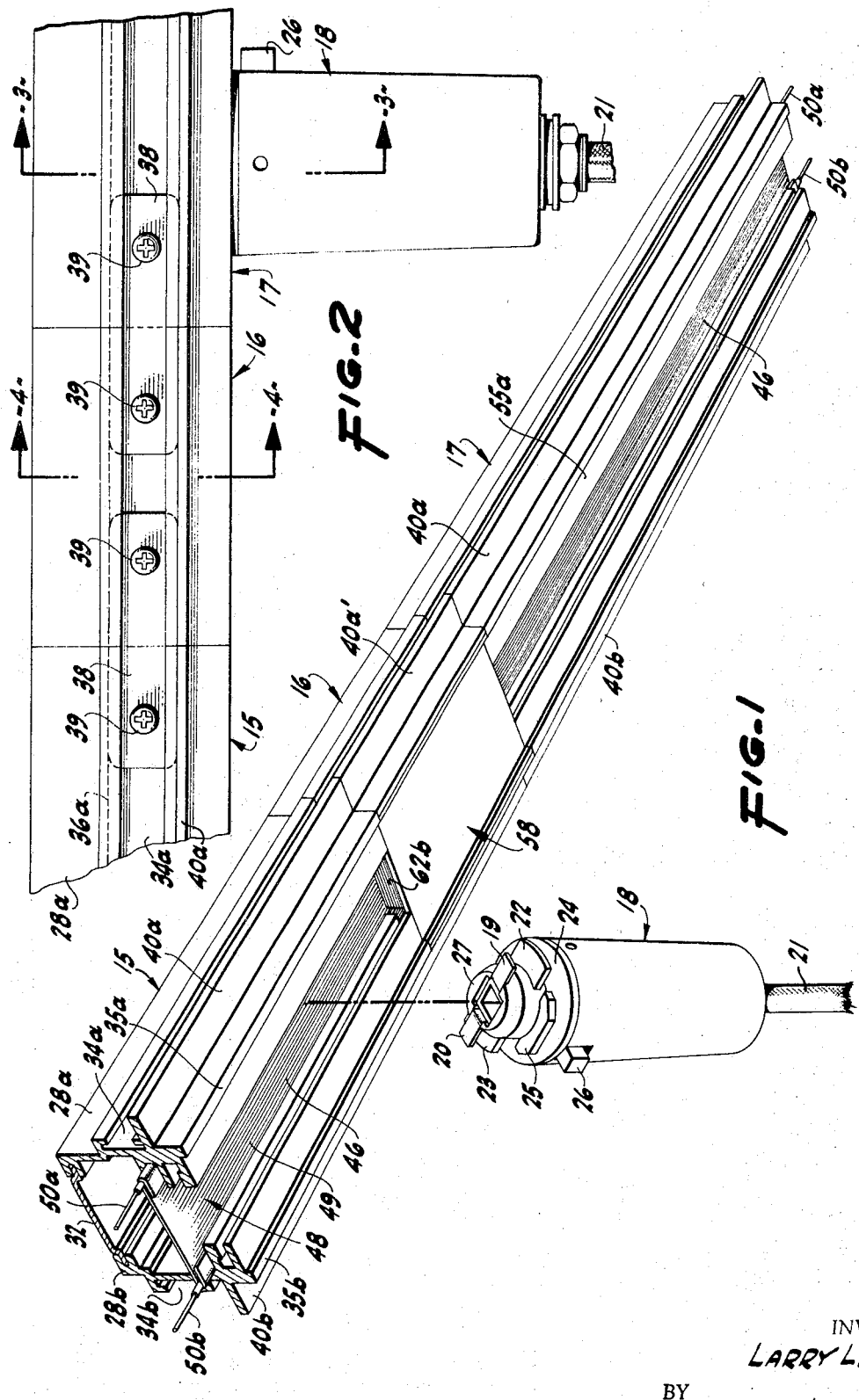
INVENTOR.
LARRY L. ROUTH
BY
Gardner & Zimmerman
ATTORNEYS

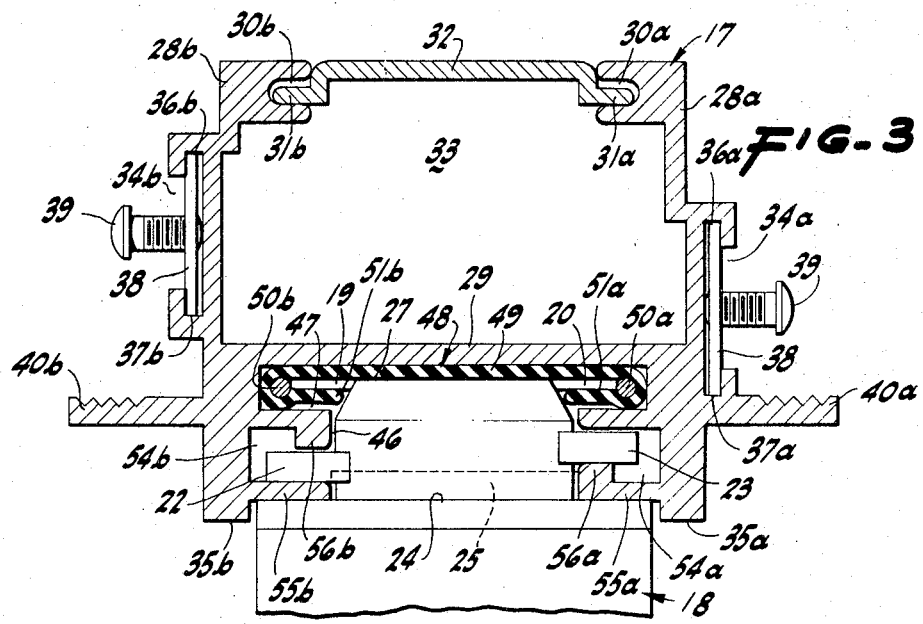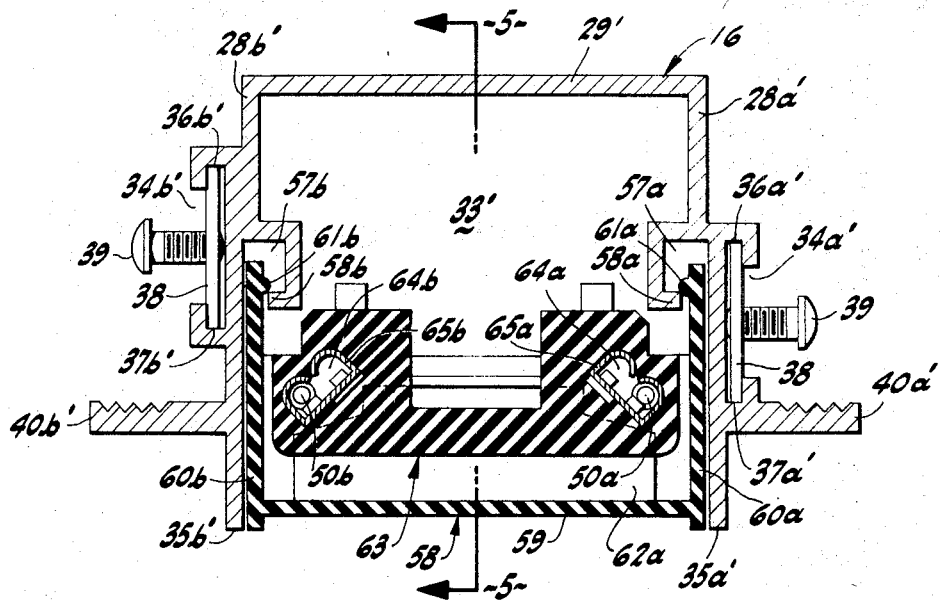

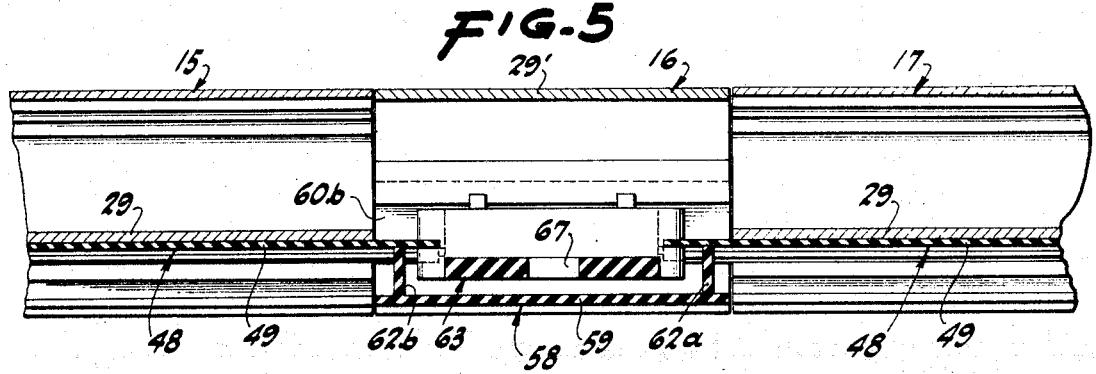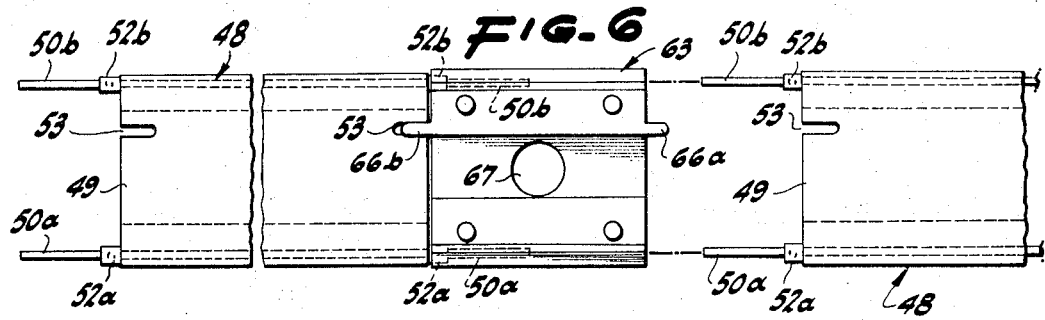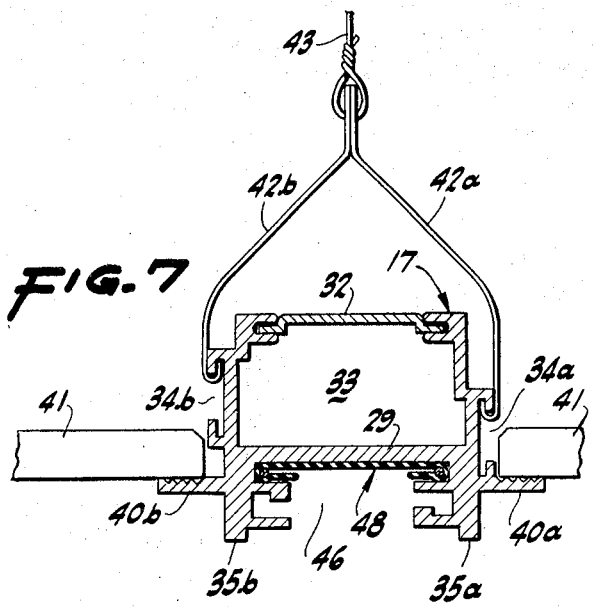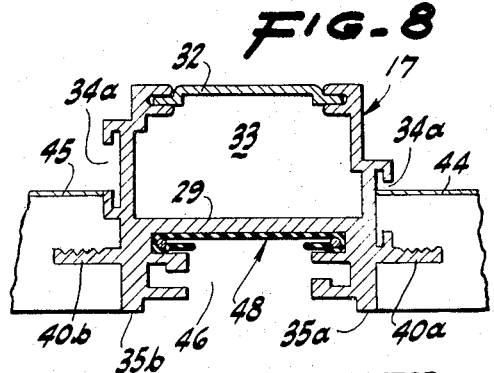

INVENTOR.
LARRY L. ROUTH
BY
Gardner & Zimmerman
ATTORNEYS

United States Patent Office 3,529,274
Patented Sept. 15, 1970

3,529,274
POWER DISTRIBUTION SYSTEM
Larry L. Routh, Castro Valley, Calif., assignor to U.S. Industries, Inc., New York, N.Y., a corporation of Delaware
Filed Jan. 4, 1968, Ser. No. 695,655
Int. Cl. H01r 9/22
U.S. Cl. 339—21
26 Claims

ABSTRACT OF THE DISCLOSURE

A power distribution system providing a substantially continuous convenience outlet enabling electrical plugs to be connected thereto at any selected location therealong. The system includes one or more elongated track components adapted to be partially or completely embedded within a ceiling or other building wall, and such components are provided with a conductor assembly extending therealong and equipped with spaced apart conductors with which the contacts of a male fitting or plug are electrically connectible. The track components are provided externally along opposite sides thereof with longitudinally extending channels offset with respect to each other so as to polarize the track components and thereby enforce a predetermined orientation on a succession of track components interconnected one with another. The substantially continuous convenience outlet is provided by a longitudinally extending receptacle having offset recesses therein defining polarization means enabling a complementary-polarized plug to be connected therewith in only one predetermined orientation. Certain of the track components define splice boxes provided with selectively attachable bottom closures, and other of the track components have removably mounted top covers therefor. The track components may be supported by means of hanger elements receivable within the external polarization channels extending along the side walls of each track component.

---

This invention relates to a power distribution system and, more particularly, to an improved system characterized by having track components which are adapted to be wholly or partly recessed within a ceiling or other building wall. Certain of the track components provide substantially continuous receptacles or convenience outlets adapted to have plugs connected thereto at any selected location therealong, and the system and track components thereof are especially useful with electric lights in that they enable lights to be located and supported by the track at any desired position therealong and to be changed quickly and easily from one such position to another.

The location of convenience outlets, junction boxes and other points of connection with an electric power distribution system is at best a compromise with the various locations being selected on the basis of custom or in anticipation of expected future use. This is particularly unsatisfactory especially in commercial and industrial buildings since the use of any particular space therein is not necessarily static and any change in use may require relocation of the various outlets and other points of connection. In this same respect, the dividing walls or partitions in such buildings may be changed bodily, and modern buildings are designed so as to afford ready change of such dividing walls from one location to another so as to provide considerable versatility in the use of the building space. In view of this, power distribution systems have been proposed heretofore which are intended to afford a degree of flexibility as respects the location at which lights and other electrically operated devices may be connected with the power distribution system.

A general object of the present invention is to provide an improved power distribution system of the type affording substantially infinite selection of the locations along the length thereof at which lights and other electrically operated devices can be connected thereto. More particular objects, among others, are to provide an improved power distribution system of the character described in which such substantially continuous convenience outlet is polarized so that contact-equipped plugs can be connected therewith in only one orientation, thereby causing a predetermined polarity to be observed throughout the system; in which the system includes one or more track components each of which is equipped with external polarization means to enforce a predetermined orientation on a succession of the track components interconnected one with another so that such predetermined polarity is maintained; in which the track components are provided with outwardly extending flanges cooperative with a ceiling or other building wall in the recessing of the track component therein, the flanges serving as trim frames for dry building-wall constructions and as plaster frames for plaster and poured concrete building-wall installations; in which a selectively positionable top cover is provided for certain of the track components and a selectively mountable bottom closure for other track components; and in which hanger elements cooperative with the external polarization means may be used to secure the track components to joists or other structural members forming a part of a building wall.

A power distribution system embodying the present invention may include a plurality of elongated, longitudinally extending track components connected one with another in a succession thereof, and such track components may include a splice box (a coupling or end box or both) and a receptacle-equipped track component defining a longitudinally extending convenience outlet positioned therealong. Each of the track components is rigid and is equipped exteriorly along the side walls thereof with offset channels defining polarization means enabling a plurality of successive track components to have a predetermined orientation enforced thereon when connected one with another, and such side walls further have outwardly extending flanges cooperative with a building wall in which the track components are partially or wholly concealed.

Each receptacle-equipped track component is provided interiorly with offset recesses defining polarization means enabling complementary-polarized male fittings or plugs to be connected along the convenience outlet in only one predetermined orientation with respect thereto. The track components are also provided with a longitudinally extending compartment defining a wireway therealong in which insulated conductors can be carried from one location to another. Each such receptacle-equipped track component has a removable cover to enclose such wireway along the upper end thereof. The splice boxes enable successive receptacle-equipped track components to be interconnected, or to enable such components to be connected with power distribution conductors, and such boxes have an insulating bottom closure to cover the underside thereof after an appropriate splice has been made.

Embodiments of the invention are illustrated in the accompanying drawings, in which:

FIG. 1 is a broken perspective view illustrating a portion of a single electric circuit power distribution system embodying the present invention, a plug of such system being shown in spaced relation with the track components thereof;

FIG. 2 is an enlarged, broken side view in elevation of a portion of the system illustrated in FIG. 1;

FIG. 3 is a further enlarged, transverse sectional view of a receptacle-equipped track component taken along the plane 3—3 of FIG. 2;

FIG. 4 is a transverse sectional view of a splice box track component taken along the plane 4—4 of FIG. 2;

FIG. 5 is a broken, longitudinal sectional view taken along the plane 5—5 of FIG. 4;

FIG. 6 is a top plan view of a conductor assembly showing the relationship thereof with a connector element associated with the splice box shown in FIGS. 4 and 5;

FIG. 7 is a transverse sectional view in reduced scale, generally similar to FIG. 3, illustrating a track component in partially concealed relation with a dry-construction ceiling or building wall;

FIG. 8 is a transverse sectional view similar to that of FIG. 7 but showing the track component wholly concealed within a wet-construction, plaster or concrete, ceiling or building wall;

Figure 10:
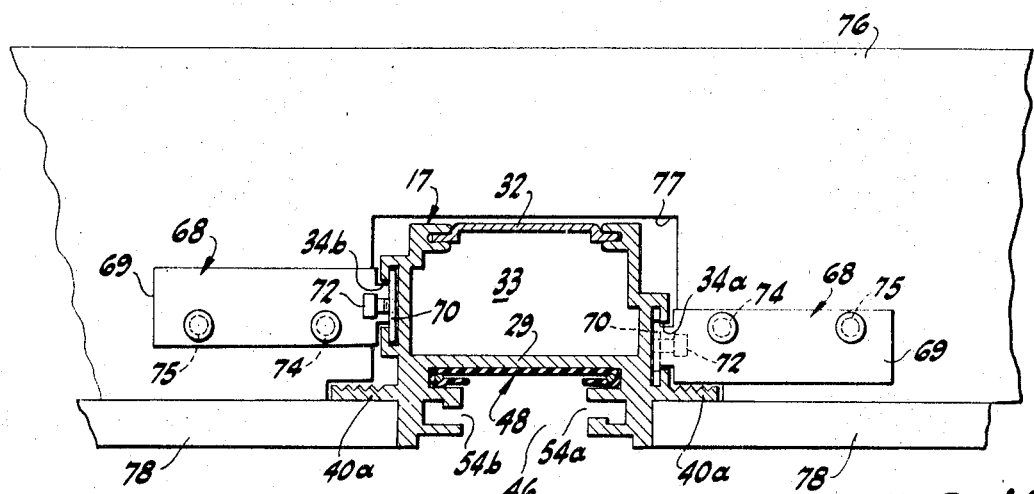
FIG. 10 is a transverse sectional view showing the hanger elements of FIG. 9 in one position of use thereof for connecting a track component to a ceiling joist.
Figures 9, 11:
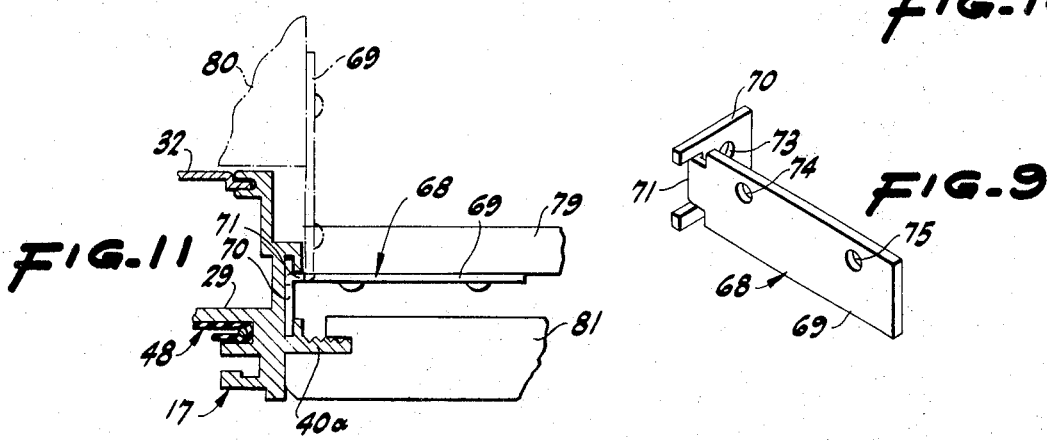
FIG. 9 is a perspective view of a hanger element usable to secure the track components to building wall structures.
Figure 12:
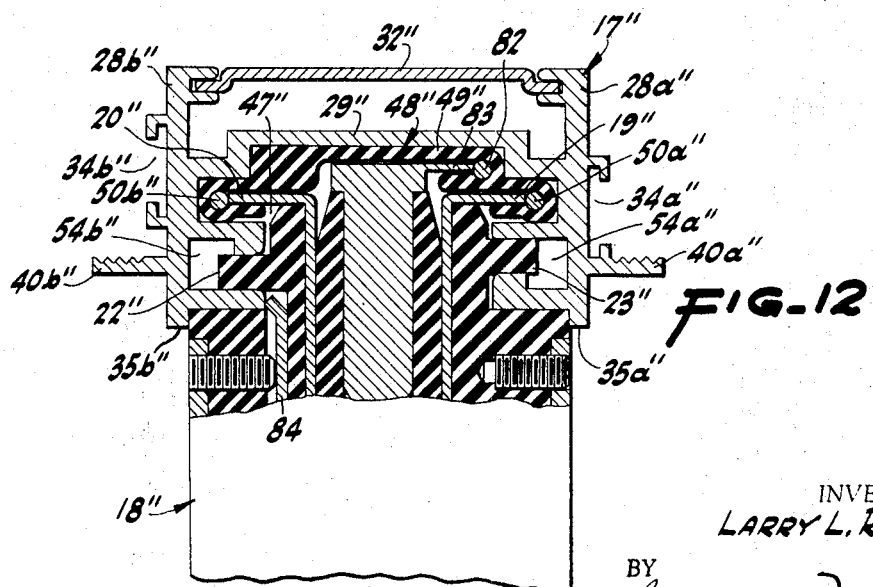

FIG. 11 is a broken, transverse sectional view similar to that of FIG. 10 but showing the hanger component in another position of use for securing a track component to a ceiling support, a still further position of the hanger element being illustrated in broken lines; and FIG. 12 is a transverse sectional view similar to that of FIG. 3 but showing a modified construction in which the assembly accommodates a double electric circuit having three conductors.

The power distribution system illustrated in FIG. 1 is for a two-conductor single electric circuit, and it includes a plurality of interconnected track components respectively denoted with the numerals 15, 16 and 17. The track components 15 and 17 are each receptacle-equipped components adapted to have one or more plugs connected therewith at various locations therealong, and such components 15 and 17 are substantially identical in construction and function. The track component 16 is a splice box, and in the particular form shown is a coupler or joiner box by means of which a plurality of receptacle-equipped track components 15 and 17 may be connected one with another. In the usual case, a splice box is also provided at least at one end of a run of track components so that the conductors thereof can be connected conveniently to the lower lines. Such splice boxes at an end of a run are sometimes referred to as end boxes, and since they are substantially similar to the coupler box shown, a specific illustration of an end box has been omitted.

Cooperative with the receptacle-equipped track components 15 and 17 at any desired location therealong is a plug or male adapter 18 which can be releasably secured to the component at any such location and connected electrically with the conductors thereof. The plug 18 shown in FIGS. 1, 2 and 3 is provided with a pair of substantially rigid contacts 19 and 20 that are horizontally disposed and extend radially outwardly in opposite directions from the center of the plug for respective connection with a pair of electric conductors lying along the track component, as will be described hereinafter. The contacts 19 and 20 are respectively connected through lead wires or other conductors (not shown) located within a conduit 21 with an electric device (such as an incandescent light), and such connection thereof may be completely conventional. The plug 18 may be equipped with a ground contact for connection with the track component, as will be further explained with respect to the modified assembly shown in FIG. 12.

The plug 18 is provided with a pair of polarized support members 22 and 23 that are also horizontally disposed and extend radially outwardly from the center of the plug on opposite sides thereof. Polarization of the support members 22 and 23 is effected by offsetting the same relative to each other along the longitudinal axis of the plug. Thus, in the plug illustrated, the spacing between the support member 23 and face 24 of the plug is greater than the corresponding spacing between the support member 22 and face 24. The plug 18 is also provided with a spring biased latch 25 that normally extends upwardly above the face 24, as shown in FIG. 1, but which can be retracted against the biasing force by downward displacement of a control button 26 connected with the latch. It may also be observed that the contacts 19 and 20 are at substantially the same elevation, and the upper surfaces thereof are in substantially planar alignment with the upper abutment surface 27 of the plug. The use of the plug 18 and cooperative relationship thereof with the receptacle-equipped track components 15 and 17 will be brought out in greater detail hereinafter, and is the subject of an application filed contemporaneously herewith and in which applicant is a joint inventor namely, Ser. No. 695,597, filed Jan. 4, 1968 and entitled "Adaptor For Electrical Power Distribution Track."

Referring to FIG. 3 in particular, the receptacle-equipped track component 17 is seen to be generally symmetrical about a vertical center line therethrough except for the polarization means operative in one instance to enforce a predetermined orientation on a succession of track components interconnected one with another, and operative in another instance to cause the plug 18 to have a predetermined orientation with respect to the track component. In view of this general symmetry, the same numerals are employed to identify the oppositely positioned counterpart elements except that the suffixes $a$ and $b$ are added for purposes of differentiation therebetween.

Accordingly, the track component 17 is seen to have a pair of longitudinally extending and transversely spaced side walls 28a and 28b formed integrally with a longitudinally extending web 29 that is transversely disposed and projects between the side walls intermediate the top and bottom thereof. Adjacent their upper ends, the side walls 28 turn inwardly and define longitudinally extending passages 30a and 30b that slidably receive therein the outer longitudinal edge portions 31a and 31b of a cover 32. The cover 32 is slidably removable from the position thereof shown in FIGS. 1 and 3, and the cover together with the web 29 and spaced apart side walls 28 define a longitudinally extending chamber or wireway 33 in which insulated wires or other conductors may be carried from one location to another should this be desired.

Exteriorly, the side walls 28a and 28b are provided with polarization means that enforce a predetermined orientation onto a succession of track components interconnected one with another, and such polarization means are formed by exterior channels 34a and 34b that are longitudinally extending and are offset relative to each other with respect to the top and bottom of the track component. Thus, the channel 34a is closer to the bottom plane of the track component as defined by the edges 35a and 35b thereof than is the channel 34b. The two channels 34 are partially closed and are respectively formed by spaced apart, facing, generally U-shaped grooves 36a and 37a in the case of the channel 34a, and by corresponding facing grooves 36b and 37b in the case of the channel 34b. Thus, the channels 34 are completely closed along the top and bottom longitudinal edges thereof, are completely closed along the inner surfaces thereof by the associated side walls 28 and are partially closed along their outer surfaces.

As a consequence thereof, coupling links or splines 38 dimensioned so as to be slidably received within the channels (as shown in FIGS. 2 and 3) are constrained thereby against displacements with respect to the track components except in longitudinal directions therealong. The splines 38 are generally rectangular in configuration and are used to fixedly connect adjacent track components, as seen in FIG. 2; and referring thereto, it is seen that a spline 38 bridges the line of mergence of the track components 15 and 16 and is fixedly located with respect thereto by a plurality of set screws 39 that threadedly extend through apertures provided therefor in the splines and which bear against the underlying outer surface of the associated side wall 28 of the track component. In a similar manner, a spline 38 bridges the mergence of the track components 16 and 17 and rigidly relates these two components by means of set screws 39. Evidently, splines 38 are located within each of the channels 34a and 34b so that the successive track components are rigidly related to each other by splines 38 along each side of the track components. It may be noted that the splines 38 together with the associated set screws 39 electrically connect one track component with another so that the track components can be used as a ground conductor in the associated electric circuit should this be desired.

The side walls 28 are respectively provided with outwardly extending flanges 40a and 40b disposed below the channels 34 and which flanges are useful in completely or partially recessing the track components in a building wall, as shown in FIGS. 7 and 8. The flanges 40 may be knurled or otherwise roughened, as along the upper surfaces thereof, to increase the coefficient of friction defined thereby with any contiguous surface associated therewith. Referring to FIGS. 7 and 8, the first illustrates a track component in association with a dry-construction building wall (which may be taken to be a ceiling), in which event the flanges serve as trim frames for the ceiling panels 41. The panels 41 may be of any conventional type such as sheet rock or acoustical tile, in which event the ceiling panels are supported independently of the track components. However, the arrangement illustrated in FIG. 7 may be a type of dry wall assemblage sometimes known as an exposed T-bar construction in which the ceiling panels 41 rest upon and are supported by the flanges 40. In this case, the track components are suspended from structural members of the ceiling as through mounting straps 42a and 42b that are hooked into the grooves 36a and 36b, or are otherwise secured to the track components, and extend upwardly therefrom and are connected with such structural members as by means of wire hangers 43.

In the arrangement illustrated in FIG. 8, the track components are wholly concealed in contradistinction to the arrangement illustrated in FIG. 7 in which they are only partially concealed. In FIG. 8, the track components are mounted in a wet wall structure such as plaster or concrete, and the undersurface of the ceiling 44 is trowelled or otherwise made substantially flush with the lower edges 35a and 35b of the track components. Thus, in this case the flanges 40 serve as plaster frames for such ceiling 44 which may be sufficiently thick to embed the flanges therein, as shown, or may only be sufficiently thick to extend substantially to the elevation of the flanges. In the ceiling construction illustrated in FIG. 8, lathing straps 45 provide a foundation for the plaster. Evidently, the track components are advantageously supported independently of the ceiling material 44, and an exemplary arrangement for so supporting the track components will be described hereinafter in connection with FIGS. 9 through 11.

The track component 17 is provided with a chamber or receptacle 46 in underlying relation with the web 29, and such receptacle defines a longitudinally extending convenience outlet (see FIG. 1) adapted to receive therein at least one plug 18, as shown in FIG. 3. The elongated receptacle 46 adjacent the upper end thereof is provided with a longitudinally extending compartment 47 having a conductor assembly 48 mounted therein. The conductor assembly (see FIG. 6 in particular) includes an elongated insulator or insulated holder 49 that is turned inwardly upon itself along the longitudinal edges thereof to form longitudinally extending slots in which are mounted conductors 50a and 50b. The slots confine the conductors 50 therewithin and are provided with restricted mouths 51a and 51b adapted to pass therethrough the contacts 19 and 20 of the plug 18, as shown in FIG. 3.

The insulator 49 is sufficiently rigid to be substantially self-sustaining so as to maintain the conductors 50 in the spaced apart relation shown and to confine the same within the slots therefor. The conductors 50a and 50b may be conventional copper wire (12 gauge, for example), and they are constrained against longitudinal displacements with respect to the insulator 49 by collars 52 crimped about the conductors at the ends of the insulator 49, as shown in FIG. 6. The insulator 49 may have a slot 53 adjacent each end thereof along one longitudinal edge, as shown in FIG. 6, for polarization purposes so as to enforce observation of a correct polarity from the conductors 50a and 50b.

The receptacle 46 defining the longitudinally extending convenience outlet is provided with polarizing means cooperative with the polarized support members 22 and 23 of the plug 18 to enforce a predetermined orientation thereon when mounted within the recepttacle with the contacts 19 and 20 in engagement with the conductors 50 so as to establish a preselected polarity between the conductors and contacts. The polarization means includes a pair of transversely spaced and longitudinally extending recesses 54a and 54b which are disposed along the side walls 28a and 28b adjacent the bottoms thereof. The recesses 54 are offset with respect to each other from top to bottom of the track component (as shown in FIG. 3) to effect such polarization and, accordingly, the support member 23 is alignable only with the recess 54a so as to enter the same and, correspondingly, the support member 22 is alignable with and may enter only the recess 54b.

In positioning the plug 18 in the longitudinally extending receptacle 46, as shown in FIG. 3, the plug is inserted into the receptacle with the contacts 19 and 20 and support members 22 and 23 oriented in substantial longitudinal alignment therewith. When the plug is fully inserted into the receptacle—which insertion is defined by engagement of the abutment wall 27 of the plug with the undersurface of the insulator 49—the latch 25 will be automatically depressed downwardly so as to be substantially flush with the upper face 24 of the plug because of the engagement of such latch with one or the other of the transversely spaced and longitudinally extending stops 55a or 55b respectively associated with the recesses 54a and 54b depending upon the initial orientation of the plug (i.e., whether the latch 25 and button 26 face the wall 28a or wall 28b of the track component). Thus, as respects the latch 25, it offers no constraint to angular displacement of the plug 18 at this time.

Nevertheless, the plug 18 can be displaced in one angular direction only because of the recesses 54a and 54b being offset correspondingly with the offset of the support members 22 and 23 of the plug 18. Thus, an effort to rotate the plug 18 in one angular direction will cause the support member 22 to abut the upwardly projecting boss 56a associated with the recess 54a, and will similarly cause the support member 23 to abut the downwardly projecting boss 56b associated with the recess 54b. Accordingly, a positive constraint against rotation in such one angular direction will be enforced on the plug. Angular displacement of the plug in the opposite direction is permitted, however, because of the alignment of the support members 22 and 23 with the respective recesses 55b and 55a; and as the plug is displaced in such direction through a distance of approximately 90°, the latch 25 is released from engagement with the stop 55a or 55b, as the case may be, and is displaced upwardly into a position between such stops (as shown in FIG. 3) by the biasing force operative against the latch. The plug 18 is then positively locked against rotation in either angular direction by the latch 25, and at this time the contacts 19 and 20 of the plug are in mechanical and electrical engagement with the respective conductors 50b and 50a because during such rotation of the plug, the contacts thereof pass through the mouths 51b and 51a of the slots along the insulator 49 within which such conductors are mounted.

The plug 18 can be removed from the receptacle by displacing the button 26 downwardly to retract the latch 25 into the face 24 of the plug whereupon it can be rotated in either angular direction through a distance of approximately 90° to withdraw the support members 22 and 23 from the polarization recesses 54 and to withdraw the contacts 19 and 20 from the slots containing the conductors 50. The plug 18 can be located at any desired position along the entire length of the receptacle 46; and to mount the plug it is simply pushed completely into the receptacle and then rotated 90° in whichever direction it is free to rotate, as heretofore explained. To remove the plug, the button 26 is simply depressed and the plug rotated through 90° in either angular direction.

The track component 16 shown in FIGS. 4 and 5 is generally similar to the track components 15 and 17 heretofore described except that it defines a splice box and does not require provision for mounting a plug 18 therealong. In view of the general similarity between such track components, the primed form of the same numerals used in association with the track component 17 are employed in connection with the track components 16 where appropriate to show the corerspondence of elements. Thus, the track 16 is seen to have transversely spaced and longitudinally extending side walls 28a' and 28b' which are interconnected by an integral web 29' forming the top wall of the splice box. Such top wall may be provided therealong with a plurality of knock-out plugs (not shown) to enable connection to be made therethrough with the power distribution wires whenever the splice box is used as an end box. Exteriorly, the side walls are provided with polarization channels 34a' and 34b' as heretofore described, and they are also provided with outwardly extending flanges 40a' and 40b' for the purposes set out hereinbefore.

Interiorly, the track component 16 has a wireway 33' below the top wall or web 29' and the side walls are provided intermediate the ends thereof along their inner surfaces with longitudinally extending passages 57a and 57b that open downwardly through restricted necks 58a and 58b. Cooperative with such passages 67 is a bottom closure 58 having a bottom wall 59 and upwardly extending side walls 60a and 60b respectively equipped adjacent the upper edges thereof with one or more inwardly facing beads or protuberances 61a and 61b. The upwardly extending walls 60a and 60b of the bottom closure normally have a slight inward inclination when relieved of all stress so that they tend to converge upwardly and inwardly, but the cover is sufficiently flexible to enable the upwardly extending walls to be displaced outwardly as the protuberances 61 engage the restricted necks 58a and 58b to permit the protuberances to pass therethrough. When the closure 58 is in the position shown in FIG. 4, the inward inclination of the walls 60a and 60b cause the protuberances 61 to engage the necks 58a and 58b to resist removal of the closure.

The closure 58 has transversely disposed end walls 62a and 62b which are longitudinally spaced and extend upwardly but to a much lesser elevation than that of the side walls 60. In this respect, the end walls 62 are adapted to substantially abut the undersurface of the insulator 49, as shown in FIG. 5; and the closure member 58 is substantially the same length as the splice box or track component 16 so that the bottom wall 49 of the closure effectively covers the same from end to end. Disposed within the splice box intermediate the end walls 62 of the closure 58 is an insulated connector 63 having transversely spaced openings 64a and 64b extending longitudinally therethrough and in which are mounted hollow connector contacts 65a and 65b adapted to receive end portions of the conductors 50 therein (as shown in FIG. 6) so as to make electrical connection therewith. Thus, as illustrated in FIG. 5, successive receptacle-equipped track components 15 and 17 can be interconnected one with another through the splice box or track component 16 by inserting end portions of the conductors 50 of each track component into the connector contacts 65 of a connector 63 located within the splice box.

Correct polarity is observed during such interconnection because of the proper orientation enforced upon successive track components 15, 16 and 17 by the external polarizing channels 34a, 34b and 34a', 34b', and proper polarity of the connector 63 is necessarily observed because it is equipped along one edge thereof with polarizing projections 66a and 66b that are alignable with and receivable in the polarizing slots 53 in the insulators 49. Such polarization has most significance in the power distribution system being considered in the case in which the conductors 50a and 50b are of different gauge. The connector 63 has a central opening 67 therethrough which may be used in those cases in which the splice box 16 is employed as an end box since a slightly different bottom closure 58 may be employed which is more readily removable and may be secured in place by a cap screw passing through the opening 67.

As indicated hereinbefore, the track components can be supported within a building wall by support elements or hangers cooperative with the external channels 34 in the track components. Such a hanger is illustrated in FIG. 9 and is designated in its entirety with the numeral 68. The hanger is generally L-shaped and comprises a pair of legs 69 and 70 that are joined by a neck 71. The hanger 68 is dimensioned from top to bottom thereof (as viewed in FIG. 9) so that either of the legs 69 or 70 may slide into the channels 34; and in FIG. 10, the leg 70 of a hanger 68 is positioned within the channel 34a and is fixedly anchored in position therealong by a set screw 72. In a similar manner, the leg 70 of a hanger 68 is mounted within the channel 34b and is secured thereto by a set screw 72. In each case, the set screw 72 is threadedly received within an opening 73 provided therefor in the leg 70 and such opening is centrally oriented. In the case of the leg 69, a pair of spaced apart openings 74 and 75 are provided and they are located in relatively close proximity to one of the longitudinal edges of the leg. Accordingly, and as shown in FIG. 10, the hanger 68 associated with the channel 34a and hanger 68 associated with the channel 34b are inverted with respect to one another, wherefore all of the openings 74 and 75 are disposed at substantially the same elevation.

In FIG. 11 the track component 17 is disposed at right angles with respect to and traverses the ceiling joists 76 each of which is provided with an opening 77 therein within which the track component seats. The legs 69 of the hangers 68 extend outwardly along the plane of the joists 76 and are nailed or otherwise secured thereto by fasteners extending through the openings 74 and 75. It may be noted in FIG. 10 that the plaster covering 78 of the ceiling is substantially flush with the flanges 40a and 40b, as distinguished from the ceiling 44 shown in FIG. 8 in which the plaster extends above the flanges.

Alternatively, the hangers 68 may be mounted within the channels 34 as shown in FIG. 11, in which case each hanger 68 has been displaced 90° with respect to the position thereof shown in FIG. 10 so that the leg 69 is horizontally oriented rather than vertically disposed. The leg 69 is nailed or otherwise secured to a cross brace 79 forming a part of the ceiling structure. As a further alternative, the leg 69 can be bent upwardly about the neck 71 into the position shown by dotted lines in FIG. 11 and secured to a structural component 80 of a ceiling. Evidently, the length of the leg 70 including the tabs at the neck 71 enables it to be slidably received within the channels 34 in the orientation shown in FIG. 11. It may be observed that still another type of dry-construction ceiling panel 81 is shown in FIG. 11 in association with the track component 17 and flange 40a thereof.

The modified system illustrated in FIG. 12 accommodates a double electric circuit having three conductors and except for the change required by such double electric circuit, the track components are the same as those heretofore described. Accordingly, the double primed form of the same numerals previously used are again employed in FIG. 12 to designate respectively corresponding elements. As concerns the structural change required to accommodate such double circuit, the web 29" is offset upwardly so that the longitudinally extending compartment 47" is enlarged centrally. Otherwise, the track component 17" is structurally and functionally the same as the track component 17 heretofore described in detail, particularly in connection with the illustration thereof in FIG. 3.

The insulator 49" of the conductor assembly 48" is similarly enlarged centrally so as to accommodate an additional conductor 82. Otherwise, the conductor assembly 48" is equipped with transversely spaced conductors 50a" and 50b" as in the prior embodiment. The plug 18" is quite similar to the plug 18 heretofore described except that it is provided with an additional contact 83 cooperative with the conductor 82, as shown in FIG. 12. Thus, when the plug is in position, the three contacts 19", 20" and 83 thereof respectively engage and make an electrical connection with the conductors 50b", 50a" and 82.

As suggested hereinbefore, the plugs may be equipped with a ground contact 84 that establishes an electrical connection with the associated track component whenever the plug is rotated into the mounted position thereof. Thus, a light or other electrical device connected with the plug may be grounded through the track components (assuming they are suitably grounded) whenever the plug is in its mounted position. It may be noted that the contact 84 has an outwardly turned edge so that it scrapes into the track component when the plug is rotated into position, thereby assuring a good electrical connection between the contact and track component. This arrangement presupposes a condition in which the track components are extruded aluminum units which may be anodized to provide an outer coating therefor.

While in the foregoing specification embodiments of the invention have been set forth in considerable detail for purposes of making a complete disclosure therefor, it will be apparent to those skilled in the art that numerous changes may be made in such details without departing from the spirit and principles of the invention.

What is claimed is:

1. In a power distribution system, a track component adapted to be at least partially recessed within a building wall and comprising a pair of transversely spaced and longitudinally extending side walls and a longitudinally extending transverse web disposed between said side walls and being fixedly connected therewith, each of said side walls being provided along the exterior thereof with oppositely oriented generally U-shaped grooves disposed in spaced apart facing relation to define an outwardly opening channel there-between extending longitudinally along the associated side wall for receiving support elements therein which can be moved longitudinally along the channel but are otherwise constrained thereby against significant displacements relative thereto and to said track component, said channels being offset with respect to each other from top to bottom of said track component so as to polarize the same and thereby enforce a predetermined orientation on a succession of track components interconnected one with another, said side walls defining therebetween on one side of said web a longitudinally extending chamber for receipt therein of a plurality of electrical conductors insulated one from the others, and a conductor assembly located within said chamber.

2. The power distribution system of claim 1 in which each of said side walls is equipped with an outwardly projecting longitudinally extending flange cooperative with such building wall in the aforesaid recessing of said track component therein.

3. The power distribution system of claim 2 in which said side walls and web are integral with each other and are substantially rigid.

4. The power distribution system of claim 1 in which said web is located intermediate the top and bottom of said track component, and in which said chamber is located along the bottom side of said web and defines a longitudinally extending receptacle adapted to receive at least one contact-equipped plug therein at any selected location therealong, said receptacle being provided with polarizing means to enforce a predetermined orientation on any such plug and thereby establish a preselected polarity as between said conductor assembly and the respective contacts of such plug.

5. The power distribution system of claim 4 in which said side walls are respectively provided with inwardly facing recesses extending longitudinally therealong and being offset with respect to each other from top to bottom of said track component so as to define the aforesaid polarizing means for enforcing a predetermined orientation on a contract-equipped plug having correspondingly offset tongue-like support members for selective receipt within said recesses.

6. The power distribution system of claim 5 in which said conductor assembly comprises a longitudinally extending insulator having a plurality of slots extending therealong and being respectively provided with conductors therein, each of said slots having a longitudinally extending mouth therealong so as to pass one such contact therethrough to enable engagement thereof with the associated conductor to establish an electrical connection therebetween.

7. The power distribution system of claim 6 in which each of said side walls is equipped with an outwardly projecting longitudinally extending flange cooperative with such building wall in the aforesaid recessing of said track component therein.

8. The power distribution system of claim 7 in which said track component is provided with a substantially unobstructed longitudinally extending wireway above said web adapted to provide a conduit for wire conductors and the like.

9. The power distribution system of claim 8 in which said side walls adjacent the top of said track component are provided with inwardly facing passageways, and further including a cover for said wireway slidably receivable within said passageways.

10. The power distribution system of claim 9 in which said side walls and web are integral with each other and are substantially rigid.

11. The power distribution system of claim 4 in which said track component is provided with a substantially unobstructed longitudinally extending wireway above said web adapted to provide a conduit for wire conductors and the like.

12. The power distribution system of claim 11 in which said side walls adjacent the top of said track component are provided with inwardly facing passageways, and further including a cover for said wireway slidably receivable within said passageways.

13. The power distribution system of claim 1 in which said track component is a splice box and said web is disposed adjacent the top of said side walls and defines the top closure for said splice box.

14. The power distribution system of claim 13 in which said side walls are provided along the inner surfaces thereof with longitudinally extending passages having downwardly opening restricted necks adapted to pass portions of a bottom closure therethrough.

15. The power distribution system of claim 14 and further comprising a generally U-shaped closure having a base adapted to extend between said side walls and upwardly extending legs provided with protuberances adapted to be forcibly displaced through said necks so as to constrain the closure in position with respect to said splice box.

16. The power distribution system of claim 15 in which each of said side walls is equipped with an outwardly projecting longitudinally extending flange cooperative with such building wall in the aforesaid recessing of said track component therein.

17. The power distribution system of claim 16 in which said side walls and web are integral with each other and are substantially rigid.

18. The power distribution system of claim 1 and further including a plurality of said track components, one thereof being a receptacle-equipped component having a longitudinally extending receptacle therealong adapted to receive at least one contact-equipped plug therein at any selected location therealong, and another thereof being a splice box having a connector disposed therein for electrically connecting one conductor with another, said track components being disposed in aligned longitudinal abutment with the respective offset channels thereof being aligned so that the aforesaid predetermined orientation of a succession of track components is observed, and support elements comprising splines positioned within said channels so as to span the lines of mergence between adjacent track components and being fixedly secured to each so as to connect successive track components to each other.

19. The power distribution system of claim 18 and further comprising a plurality of additional support elements comprising generally L-shaped hangers having a leg thereof mounted within said channels and being fixedly secured thereto with the other leg extending outwardly for securance to a structural component of such building wall.

20. The power distribution system of claim 19 in which each of said side walls of each track component is equipped with an outwardly projecting longitudinally extending flange cooperative with such building wall in the aforesaid recessing of said track components therein, and in which the side walls and web of each track component are integral with each other and are substantially rigid.

21. The power distribution system of claim 20 in which the side walls of said receptacle-equipped track component are provided with inwardly facing recesses extending longitudinally therealong and being offset with respect to each other from top to bottom of said track component so as to provide polarizing means to enforce a predetermined orientation on any such plug and thereby establish a preselected polarity as between said conductor assembly and the respective contacts of such plug.

22. The power distribution system of claim 21 in which each of said track components is provided with a substantially unobstructed longitudinally extending wireway adapted to provide a conduit for wire conductors and the like.

23. In a power distribution system, a track component adapted to be at least partially recessed within a building wall and comprising a pair of transversely spaced and longitudinally extending side walls and a longitudinally extending transverse web disposed between said side walls and being fixedly connected therewith, connector structure provided by said track component along the exterior thereof to enable a plurality of track components to be interconnected in longitudinal succession, each of said side walls being provided along the exterior thereof with polarizing structure offset with respect to each other from top to bottom of said track components so as to polarize the same and thereby enforce a predetermined orientation on a succession of track components interconnected one with another, said side walls defining therebetween on one side of said web a longitudinally extending chamber for receipt therein of a plurality of electrical conductors insulated one from the others, and a conductor assembly located within said chamber.

24. The power distribution system of claim 23 in which said connector structure is located along each of said side walls and includes elements thereof in common with said polarizing structure.

25. The power distribution system of claim 24 in which said common elements of said connector and polarizing structures extend longitudinally along the respectively associated side walls.

26. The power distribution system of claim 25 in which said common longitudinally extending elements along each of said side walls define a longitudinally extending channel for receiving support elements which can be moved longitudinally therealong but are otherwise constrained against significant displacements relative thereto and to said track component.

References Cited

UNITED STATES PATENTS

| | | | |
|---|---|---|---|
| 1,912,424 | 6/1933 | Batter | 339—21 |
| 2,478,006 | 8/1949 | Paden | 339—21 |
| 3,246,074 | 4/1966 | Neumann et al. | 339—21X |
| 3,391,377 | 7/1968 | Corl et al. | 339—21 |

RICHARD E. MOORE, Primary Examiner